Patented Nov. 24, 1925.

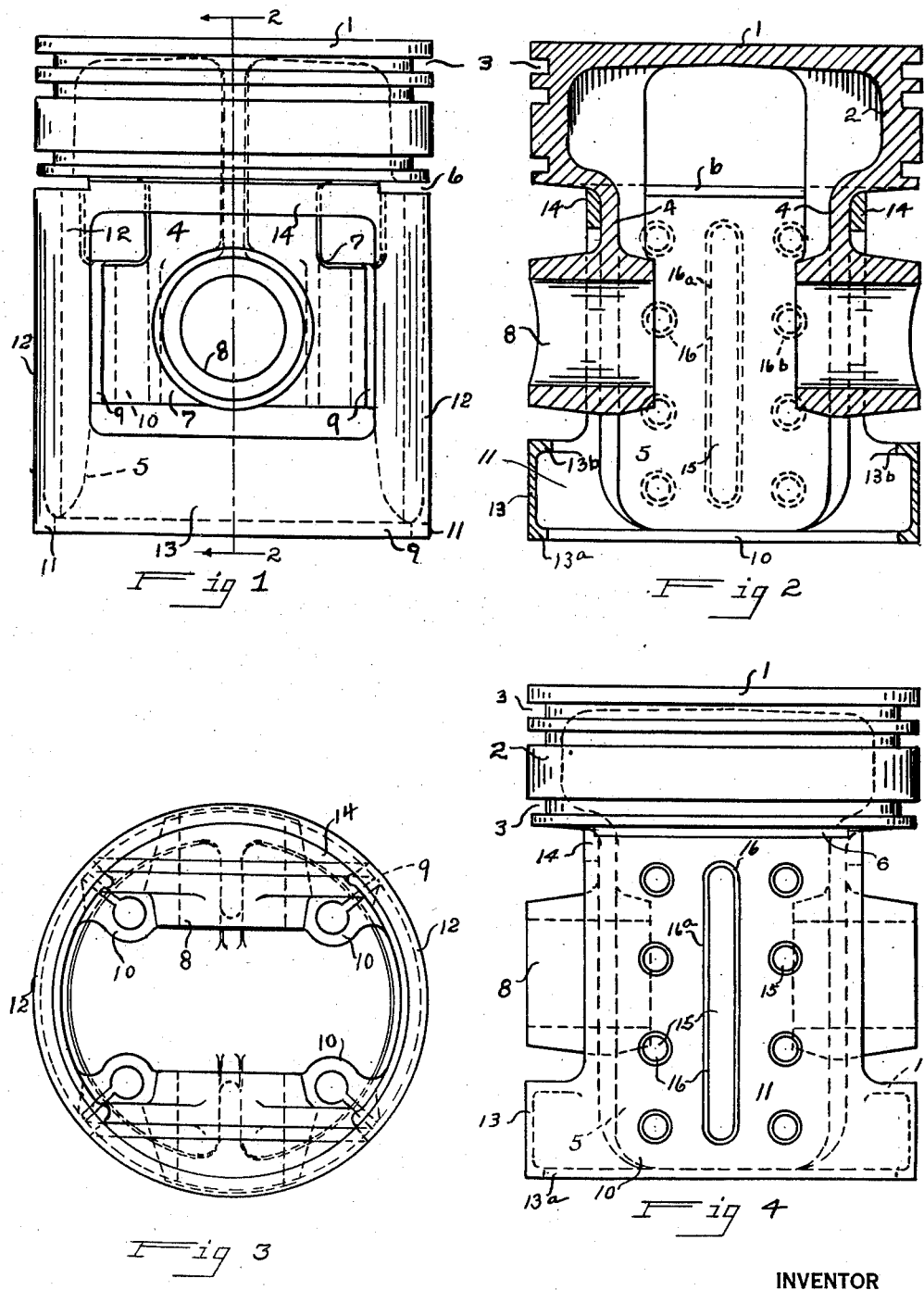

1,563,194

UNITED STATES PATENT OFFICE.

FRANK JARDINE, OF CLEVELAND, OHIO, ASSIGNOR TO ALUMINUM COMPANY OF AMERICA, OF PITTSBURGH, PENNSYLVANIA, A CORPORATION OF PENNSYLVANIA.

PISTON.

Application filed July 31, 1925. Serial No. 47,213.

*To all whom it may concern:*

Be it known that I, FRANK JARDINE, a citizen of the United States, residing at Cleveland, in the county of Cuyahoga and State of Ohio, have invented certain new and useful Improvements in Pistons, of which the following is a specification.

This invention relates to pistons of the composite type for internal combustion engines. It is particularly concerned with a piston comprising a light metal head and a heavier metal skirt cast together.

One of the chief objects of the invention is to construct a piston composed of two parts having different coefficients of expansion in which the parts are formed united to each other in a manner to permit the normal expansion and contraction of the parts without breakage of either one or of the connections between the two.

Other objects will appear and be pointed out hereinafter.

Another object of my invention is to limit the rate of expansion of the piston skirt so as to maintain it substantially in harmony with that of the engine cylinder in which it operates.

In the drawings attached hereto and forming a part of this specification:—

Fig. 1 is a side elevation of a piston embodying my invention;

Fig. 2 is a sectional view on line 2—2 of Fig. 1;

Fig. 3 is an open end plan view of the piston of Fig. 1; and

Fig. 4 is a side elevation taken at right angles to the view in Fig. 1.

In the drawings I have shown a piston embodying my invention and comprising a head consisting of a disc 1 having a peripheral depending ring flange 2 provided with a plurality of grooves 3 for piston rings and having a boss carrying wall 4 depending from the flange 2; and a skirt integrally connected to the head and consisting of slipper-like walls 5 arranged to take the side thrust of the piston caused by the connecting rod, each slipper 5 being spaced apart from the ring flange 2 by an air gap 6. The slippers 5 are each connected to cross webs 7 which extend laterally from the bosses 8. Each web 7 is split adjacent its outer end as at 9, and a radially disposed, short flexible arch 10 spans the split. These arches permit movement of the bearing walls relative to each other and to the walls 7 and act as joints to absorb expansion of the metal of the walls 7 without increasing the diameter across the bearing walls 5.

The outside diameter of the slippers 5 is somewhat less than the desired outside diameter across the bearing faces and a skirt 11 composed of a wear resisting metal such as iron is assembled in telescoping relation with the slippers and webs. This skirt 11 is preferably cylindrical in form with portions cut away on opposite sides to expose the bosses 8 and webs 7, thus leaving two oppositely disposed bearing walls 12 joined together by curved walls 13. The upper or free ends of these bearing walls 12 are tied together by tie webs 14 which are so disposed as to lie in substantial contact with the outer surfaces of the webs 4. In order that the skirt 11 may have the desired rigidity and strength with minimum weight, the curved walls 13 thereof are provided with a flange 13$^a$ extending inwardly and entirely around the skirt and with other flanges 13$^b$ adjacent to the upper edges of the circular portion and extending from one bearing wall to the other. The bearing walls 12 may be made very thin since their inner surfaces are in substantial contact with and therefore supported by the slippers 5.

The skirt 11 is preferably secured in assembled relation by means of perforations therein through which metal from the slippers projects. These projections of metal should be disposed fairly close to each other to prevent rupture thereof due to unequal amounts of expansion of the various parts of the piston. For example, if the head 1, slippers 5 and webs 4 and 7 of the piston are composed of aluminum alloys having a high coefficient of expansion and the skirt is formed of iron or steel having a lower coefficient of expansion, the projections 15 of aluminum alloy extending through the perforations 16 in the steel skirt may be broken by the greater expansion of the aluminum alloys. With the location of perforations and projecting metal substantially as shown, such tendency becomes of slight consequence. Although various forms of perforations may be provided in the skirt, I prefer a centrally disposed elongated perforation 16$^a$ and a series of small perforations 16$^b$ on either side of and closely adjacent thereto.

Various methods of constructing pistons embodying my invention may be adopted, but a convenient method consists in placing a skirt casting 11 in a piston mold and casting the head and remaining parts of the piston in place therein. The molten metal will flow through the perforations 16$^a$ and 16$^b$ in the skirt and cool in place, thereby uniting the two parts quite firmly. After the casting has been made it may be machined to size, the skirt being cut away until the walls thereof and particularly those supported by the slippers 4 are extremely thin and correspondingly light.

Since the metal of lower coefficients of expansion and contraction is disposed outside of the metal of higher coefficients of expansion and contraction it is necessary to take steps to prevent breakage of one metal or the other under temperature changes. This is accomplished by means of flexible arches or connectors 10 which will permit the inner metal to expand without exerting undue forces on the outer metal and to contract without rupturing the connection between the two metals.

Having thus described my invention, what I desire to secure by Letters Patent is defined in what is claimed, it being understood that the device shown and described hereinabove in detail is set forth merely for purposes of illustration and not for the purpose of defining the invention, the scope of which is defined by what is claimed.

What is claimed is:—

1. A composite piston comprising a head having a ring flange, boss carrying walls depending from the head oppositely disposed slippers, flexible means connecting the slippers to the bosses, the slippers being otherwise disconnected from the head, and a skirt assembled in telescoping relation with and bearing on the said slippers, the skirt having a smaller coefficient of expansion than the remaining parts of the piston.

2. A composite piston comprising a head having a ring flange and also having inwardly depressed boss carrying walls depending therefrom, oppositely disposed slippers separated from the head, flexible arches connecting the said slippers to the said boss carrying walls, and a circular skirt assembled in telescoping relation with and seating on the said slippers, and having perforations therein adjacent the said slippers, and projections integral with the slippers and extending through the said perforations to unite the head and skirt.

3. A composite piston comprising a head and having a ring flange and inwardly depressed boss carrying walls depending therefrom, oppositely disposed slippers separated from the head, flexible means including distortable arches joining the slippers to the boss carrying walls, a skirt assembled in telescoping relation with and substantially engaging the outer surfaces of the said depending walls and the slippers and having perforations therein adjacent the said slippers and disposed along the medial line of the slippers close to each other, and integral projections on the slippers extending through the said perforations to unite the head and skirt.

4. A composite piston comprising a head having ring flanges, substantially parallel depending walls integral therewith and carrying oppositely disposed bosses, flexible cross walls extending laterally from the depending walls, slippers disconnected from the head and carried at the outer ends of the said cross walls, a skirt comprising oppositely disposed bearing walls, tie webs uniting the upper ends of the bearing walls, the said skirt being assembled in telescoping relation with the slippers and cross walls and lying in substantial contact with the outer surfaces thereof, and means for securing the parts in assembled relation comprising perforations in one member and integral projections on the other member extending therethrough.

5. A composite piston comprising a head cast of aluminum alloys and including a ring flange, inwardly depressed webs depending therefrom and carrying oppositely disposed bosses and also resiliently carrying slippers spaced apart but otherwise disconnected from the head, and a skirt cast of iron and assembled in telescoping relation with the said cross webs and slippers and in substantial contact with the outer surfaces thereof, and means for securing the head and skirt together comprising perforations in the skirt and integral projections on the slippers extending therethrough.

6. A composite piston comprising a head having a ring flange, boss carrying depending webs integral therewith, slippers disconnected from the head, flexible means connecting the slippers to the depending webs, the head, webs, slippers and flexible means having a high coefficient of expansion, a skirt comprising oppositely disposed bearing walls, tie webs uniting the upper ends of the bearing walls, the said skirt being assembled in telescoping relation with the slippers and their said connecting means and lying in substantial contact with the outer surfaces of the latter, and means for securing the parts in assembled relation, the said skirt having a low coefficient of expansion as compared with the head, the said skirt being sufficiently strong to flex the said flexible means under increasing amounts of expansion of the parts.

7. A composite piston comprising a substantially rigid skirt formed of metal having low coefficient of expansion, and other piston parts formed of metal having a higher coefficient of expansion and including a head, boss carrying walls projecting from the head into the said skirt, slippers within the skirt and spaced apart from the head, and means distortable by the skirt under temperature changes for connecting the slippers to the boss carrying walls.

8. In a piston, the combination of a head and skirt portion of a material having a relatively high co-efficient of expansion, piston pin bosses in said skirt portion, and means made of a material of a lesser co-efficient of expansion, extending along and connected with said skirt portion over a considerable range beginning above and extending to below and including the regions occupied by the bosses and limiting the rate of expansion of said skirt throughout said range, said piston being slitted to separate the thrust faces of the skirt from the head and being relieved in the regions of the piston pin bosses.

9. In a piston, the combination of a head having ring grooves therein and skirt portion of aluminum alloy, piston pin bosses in said skirt portion and means of ferrous metal extending along and connected with said skirt portion over a considerable range, beginning below the ring grooves and above the bosses and extending to below and including the regions occupied by the bosses, and limiting the diametrical expansion of said skirt throughout said range, said piston being slitted to separate the thrust faces of the skirt from the head and being cut away in the regions of the piston pin bosses.

10. In a piston for an internal combustion engine, the combination of a head portion made of aluminum alloy and comprising a top and depending, cylindrically shaped side portions grooved circumferentially on the outside for the reception of piston rings, a skirt portion of aluminum alloy depending from said head portion and including boss carrying walls connected at their upper ends with the side walls of the head portion, piston pin bosses made of aluminum alloy mounted in said boss carrying walls and integral therewith, said bosses being diametrically opposite each other and located between the head portion and the end of the skirt portion, the thrust faces of the skirt portion between the bosses being separated from the head by air gaps, and means made of ferrous metal, connected to said aluminum alloy skirt portions for a considerable range vertically along said skirt portion, beginning below the piston head and above and terminating below the bosses, and including the region of the bosses, and adapted to limit the expansion of the skirt portions throughout said range and adjacent thereto, said skirt portions being cut away in the region of the bosses.

In testimony whereof I hereunto affix my signature this 25th day of July, 1925.

FRANK JARDINE.